United States Patent [19]

Osterhout et al.

[11] Patent Number: 4,753,117
[45] Date of Patent: Jun. 28, 1988

[54] DECOMPRESSION AND AIR CONSUMPTION COMPUTER

[75] Inventors: Ralph F. Osterhout, San Francisco; Richard B. Kash, Los Altos; Gregory F. Cederlind, Redwood City; Greta L. Gleason, Belmont, all of Calif.

[73] Assignee: Tekna, Belmont, Calif.

[21] Appl. No.: 823,914

[22] Filed: Jan. 30, 1986

[51] Int. Cl.⁴ .............. G01F 23/14; G01D 21/02; G01D 7/04; G01L 15/00

[52] U.S. Cl. .................. 73/865.1; 364/558; 340/815.01; 73/866.2; 73/866.3; 73/301; 73/714

[58] Field of Search ........ 73/432 D, 432 R, 432 AD, 73/714, 299, 300, 301, 291, 432.1, 865.1, 866.2, 866.3; 340/815.01; 364/558

[56] References Cited

U.S. PATENT DOCUMENTS

| | | | |
|---|---|---|---|
| 3,029,422 | 4/1962 | Wilson | 73/866.2 X |
| 3,058,653 | 10/1962 | Des Grendes | 73/432 D |
| 3,677,087 | 7/1972 | Alinari | 73/300 |
| 3,875,801 | 4/1975 | Bishaf | 73/753 X |
| 4,005,282 | 1/1977 | Jennings | 73/865.1 X |
| 4,054,783 | 10/1977 | Seireg et al. | 73/291 X |
| 4,107,995 | 8/1978 | Ligman et al. | 73/300 |
| 4,109,140 | 8/1978 | Etra | 73/432 D X |
| 4,188,825 | 2/1980 | Farror | 73/432 D X |
| 4,192,001 | 3/1980 | Villa | 73/432 D X |
| 4,271,897 | 6/1981 | Tatemoto | 73/866.3 X |
| 4,307,449 | 12/1981 | Strubin | 73/432 D X |
| 4,336,591 | 6/1982 | Bedzor et al. | 73/291 X |
| 4,586,136 | 4/1986 | Lewis | 73/291 X |

FOREIGN PATENT DOCUMENTS 1334496 10/1973 United Kingdom ............ 73/432 D

Primary Examiner—Tom Noland
Attorney, Agent, or Firm—Townsend and Townsend

[57] ABSTRACT

An improved SCUBA diving gauge. A pictograph display is provided which has a shape which conveys the type of information being displayed. The pictograph has the shape of a SCUBA tank for a tank pressure display and the shape of a person for a display of nitrogen absorbed. Pressure transducers coupled to the SCUBA tank and the external water provide the pressure readings required to produce the respective displays. The differential signal from the transducer is supplied to a processor through an auto-zeroing circuit. The auto-zeroing circuit uses a capacitor initially coupled to an amplifier reference input and single ended output to store an offset voltage. During a measurement, the capacitor is disconnected from the amplifier output and has its other lead coupled to a full scale value of the differential input to produce an output signal which is a ratio.

13 Claims, 7 Drawing Sheets

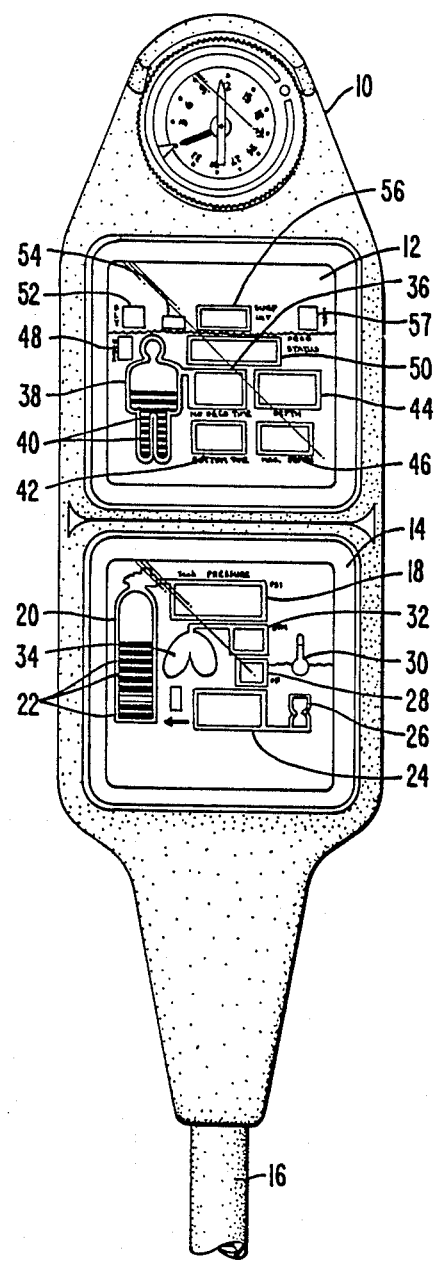
FIG._1.

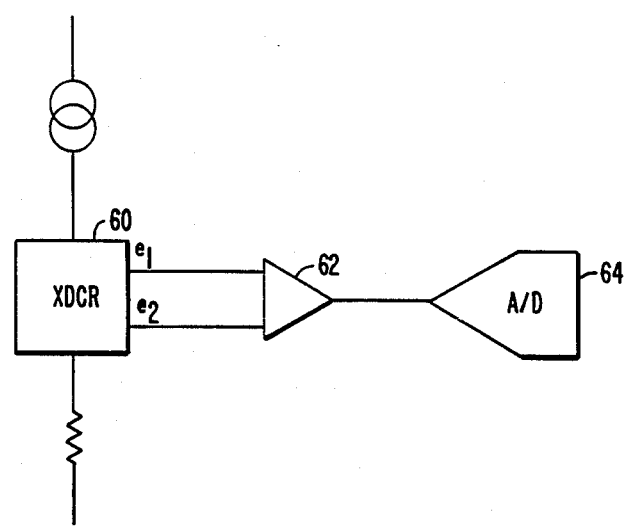
PRIOR ART
FIG._2.
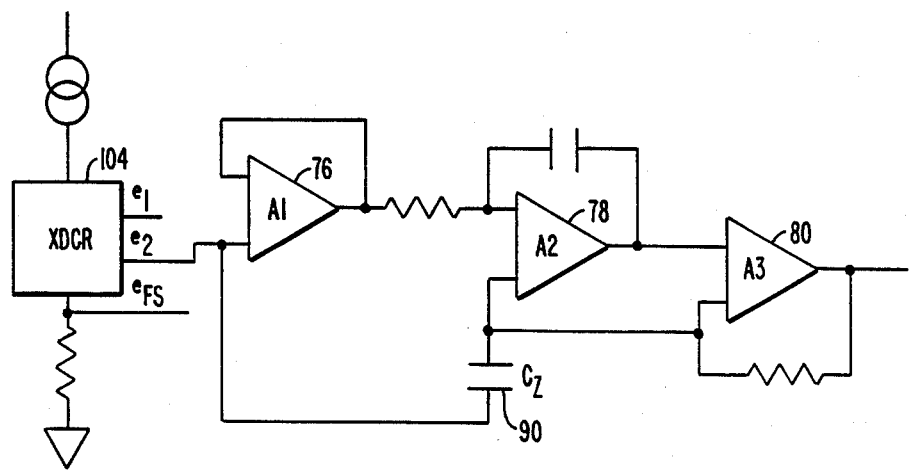
FIG._3A.

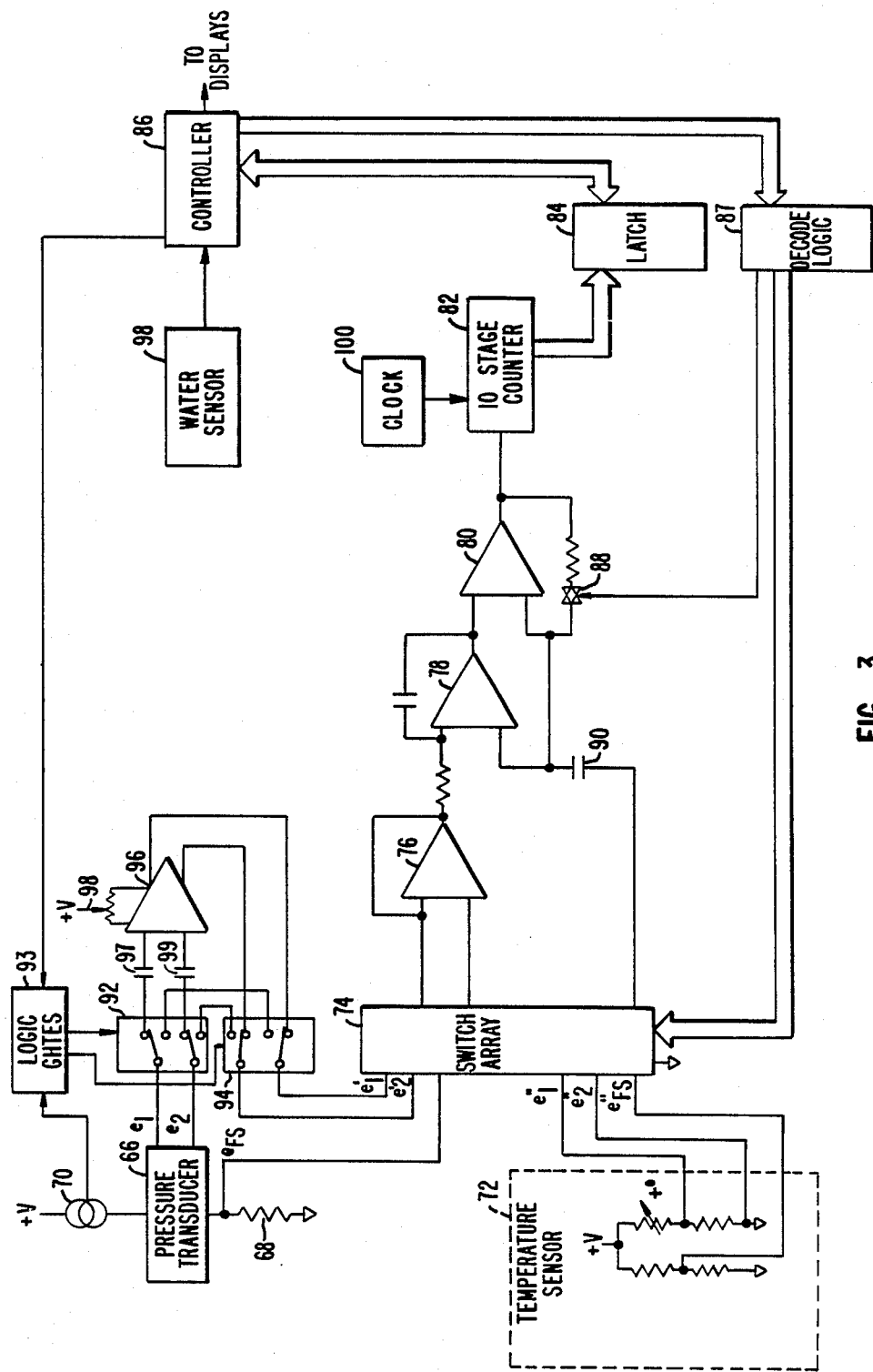
FIG._3.

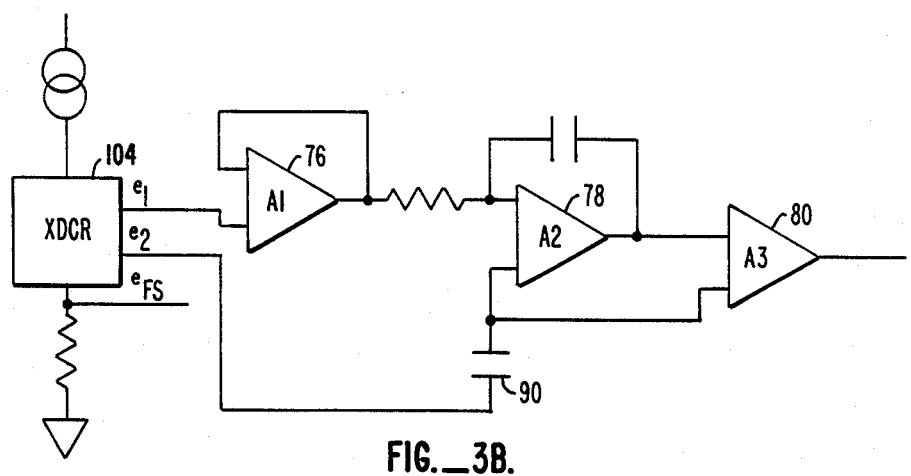
FIG._3B.
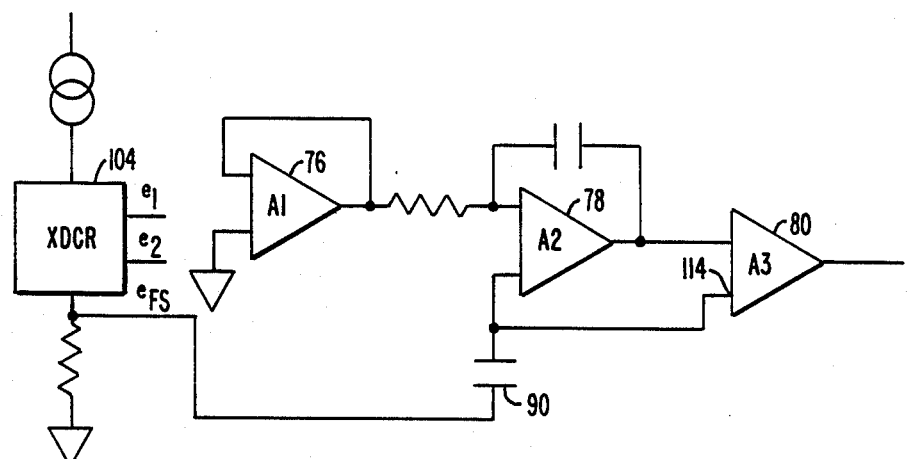
FIG._3C.
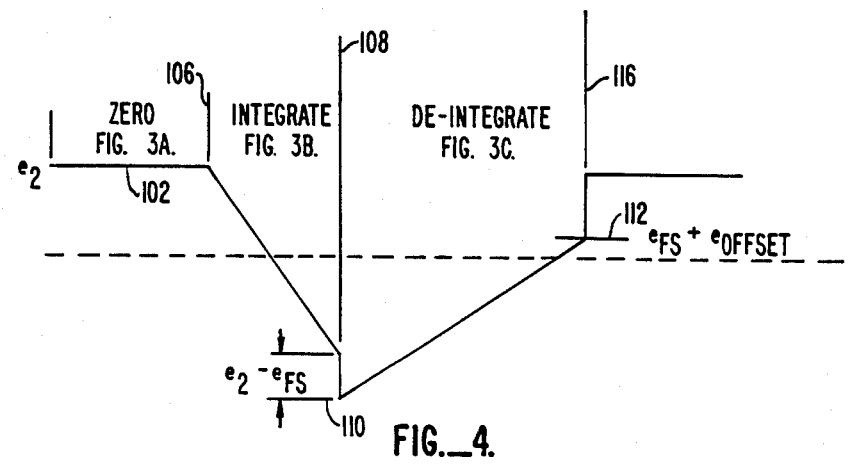
FIG._4.

DECOMPRESSION AND AIR CONSUMPTION COMPUTER

BACKGROUND OF THE INVENTION

The present invention relates to SCUBA diving gauges.

SCUBA diving gauges provide necessary information to a SCUBA diver under water. A pressure gauge is typically coupled by a hose to the SCUBA tank to provide the diver with an indication of the pressure of the air in the tank. Additional gauges may provide information regarding water depth or elapsed time on a dive. Some gauges are analog with a pointer on a display indicating the value. Other displays provide a digital readout which provides greater accuracy but is more difficult to relate to a maximum value at a quick glance.

The various gauges use transducers to measure the particular parameter being monitored. For instance, a pressure transducer is coupled to a hose to the SCUBA tank to provide a pressure signal. This is a differential signal which then has to be amplified to be analyzed. Because of the limited size of a gauge and the need for low power consumption, it is desirable to construct the circuitry in CMOS (complimentary metal oxide silicon). Unfortunately, it is difficult to design circuitry in CMOS to do such amplification.

The simple provision of air pressure in a SCUBA tank in water depth enables a diver to calculate other parameters which he needs to know when he is diving. For instance, the amount of time a diver can stay under the water for a given amount of air pressure in the tank becomes shorter as the water depth increases. This is because his lungs require air under higher pressure to balance the higher outside water pressure. It would be desirable to have a gauge which would eliminate the need for the diver to do this mental calculation. The amount of time is further affected by the breathing rate of the diver, with a faster breathing rate obviously reducing the amount of air in the tank at a quicker rate.

In addition, nitrogen in the air inhaled by a diver builds up in the tissues of his body, and upon ascent to the surface, this nitrogen will expand inside his tissues. If the nitrogen level is above a certain amount, the diver will experience what is commonly referred to as the "bends." Accordingly, a diver needs to know the amount of time he can stay under water without experiencing the bends. This amount of time is shorter at greater depths because more nitrogen at high pressure is forced into his body. This time can be calculated using tables produced by the U.S. Navy by looking up the amount of time spent at each depth. In the event the diver has stayed down too long, he must make stops at certain shallow depths during his ascent to allow the nitrogen to gradually ease its way out of his tissues. The depth of these stops and the amount of time required at each can be again determined from such U.S. Navy tables.

It can be seen that there is a need for a diving gauge providing the above described information to a diver in an easily readable form. A diver under water will normally be occupied with salvage work, spear fishing, etc. and will not want to take the time to figure out a complicated display or make calculations from such a display.

SUMMARY OF THE INVENTION

The present invention is an improved SCUBA diving gauge. A pictograph display is provided which is easily and quickly read. The pictograph is in a unique shape which conveys the type of information being displayed and has an indicating level provided on it proportional to the amount of the parameter displayed. The very shape of the display thus tells the diver what it relates to.

In one embodiment, the display is in the shape of a SCUBA tank. A pressure transducer adapted to be coupled to a hose to a SCUBA tank provides a signal proportional to a measured pressure. This signal is provided to a circuit which will light up a portion of the tank pictograph to provide an indicating level.

A nitrogen level indication is provided on a pictograph display in the shape of a person. Again, the shape of the display enables a diver to tell at a glance the nature of the information conveyed (nitrogen level). A pressure transducer is adapted to provide a signal proportional to the water pressure outside the gauge. A processor monitors the pressure signal and the amount of time spent at each pressure value. The processor continuously calculates and updates a nitrogen level according to the U.S. Navy tables or another table, formula or algorithm. This level is then supplied to the display circuit to light a portion of the person-shaped pictograph.

The processor is also adapted to calculate the remaining air time from the current pressure in the SCUBA tank and the average rate of change of such pressure. By extrapolating such rate of change, the time at which the pressure will be zero (or some offset value such as 500 psi for a safety factor) can be calculated. This is then displayed as a number of minutes of remaining air time.

In addition, the number of breaths per minute taken by a SCUBA diver can be determined. Upon each breath, there is a momentary disturbance in the pressure when air is drawn out. A separate differential amplifier is provided to amplify the pressure disturbance. By amplifying the disturbance, it can be detected by looking for a variation in amplitude greater than a certain level and extending for a certain minimum time. The processor recognizes such disturbances as breaths, and calculates the time between breaths to provide a number indicating the breaths per minute. In addition, a pictograph display in the shape of a person's lungs is filled each time a breath is detected to provide a combination of bio-feedbacks to the diver.

The circuitry for implementing the present invention is preferably done in CMOS. To avoid the difficulties of building a CMOS differential amplifier, a unique auto-zeroing amplifier is used. During a zeroing procedure, a capacitor has one lead coupled to an output of the amplifier and a reference input, and a second lead coupled to the lower of the transducer differential output voltages. The capacitor thus stores the amplifier offset voltage and the lower differential voltage. During a measurement, the output of the amplifier is disconnected from the capacitor and the lower differential output voltage is disconnected from the other end of the capacitor. The capacitor can then be coupled to a full scale reference voltage for measurement. The conversion from a differential signal to a single ended signal is thus accomplished without error due to offset voltages. By coupling the capacitor to the full scale differential voltage, the output signal is always a ratio relative to this voltage, and differential voltage drift errors are avoided.

Preferably, a series of amplifiers is used, including a buffer amplifier, an integrator and a comparator. After the zeroing procedure described above, during which a charge is stored on the capacitor, the connections are switched to allow for integration of the differential input signal. The signal is integrated for a fixed period of time, after which the full scale differential voltage is added to the capacitor and the integrated signal is de-integrated. The amount of time for the signal to de-integrate to a level corresponding to the full scale reference voltage and the charge stored on the capacitor is determined using a counter. The ratio of a count produced by the counter to the fixed time for which integration occurred gives the output value. The differential signal can come from a pressure transducer or any other transducer.

By using the auto-zeroing circuit with the pressure transducer coupled to the SCUBA tank, the tank pressure and remaining air time can be determined as described above. By using a pressure sensor coupled to the water external to the gauge, the nitrogen level can be determined as described above.

The gauge preferably includes a temperature transducer which can alternately be coupled to the auto-zeroing circuit through a series of switches controlled by the processor. The gauge of the present invention is fully automatic. The circuit for measuring the nitrogen level is activated by a sensor which detects the presence of water to put the processor in an active mode. The circuit for measuring the tank pressure and determining remaining air time is activated by the detection of some minimum pressure level, such as 50 psi.

The pictographs are preferably accompanied by a digital readout which is color coded with a color border matching a color border of the related pictograph. The use of color borders not only relates a digital display to its corresponding pictograph, but also distinguishes it from other displays having a different color border.

For a further understanding of the nature and advantages of the invention, reference should be made to the ensuing detailed description taken in conjunction with the accompanying drawings.

BRIEF DESCRIPTION OF THE DRAWINGS

FIG. 1 is a top elevation view of the display panel for a dual decompression and air consumption computer according to the present invention;

FIG. 2 is a schematic diagram of a prior art differential amplifier for amplifying a transducer signal;

FIG. 3 is a block diagram of a preferred embodiment of the auto-zeroing circuit according to the present invention;

FIGS. 3A-3C are block diagrams of a portion of the circuit of FIG. 3 showing interconnections during the zeroing, integrating, and de-integrating cycles; and FIG. 4 is a diagram of a typical zeroing, integrating and de-integrating cycle waveform for the circuit of FIG. 3.

DETAILED DESCRIPTION OF THE PREFERRED EMBODIMENTS

FIG. 1 is a top elevation view of the display panel of a gauge according to the present invention. A gauge body 10 houses a decompression computer display 12 and an air consumption computer display 14. Displays 12 and 14 are controlled by completely separate circuits. In an alternate embodiment, the same circuit is used with switches coupling the different transducers to the circuit. Body 10 is coupled to an air hose 16 which is adapted to be coupled to a SCUBA tank.

Air consumption computer 14 has a digital display 18 for providing a digital indication of tank pressure. A pictograph display 20 in the shape of a SCUBA tank provides a graphical representation of the tank pressure. A series of bars 22 formed from a liquid crystal display (LCD) is used to indicate the level of the pressure. A display 24 provides digital readout of the remaining air time. A pictograph 26 in the shape of an hourglass provides a graphical representation indicating that display 24 is a display of the remaining air time. A digital display 28 provides a digital temperature reading. A pictographic display 30 in the shape of a thermometer provides a graphic representation indicating that display 28 is a temperature display. A digital display 32 provides digital indication of the breaths per minute. A pictograph display 34 in the shape of a person's lungs provides a visual display each time a breath is detected. Pictographic display 34 is filled using bars of a liquid crystal display in the same manner as the SCUBA tank pictograph 20 discussed above. In an alternate embodiment, pictographs 26 and 30 could also be filled in the same manner.

The information necessary for the circuit controlling air consumption computer display 14 is provided by a pressure sensor (not shown) coupled to air hose 16 and a temperature sensor. The calculations necessary to produce the displays on air consumption computer 14 can all be derived from the output signals of these two sensors.

A display 36 on decompression computer display 12 provides a digital indication of the amount of time a diver can stay down without requiring decompression stops (no-decompression time). A pictograph display 38 in the shape of a person provides an indication of the nitrogen level absorbed by the person's tissue, which is related to the no-decompression time. A series of LCD bars 40 provide the indicating level.

In an alternate embodiment, display 38 provides an indication of the amount of time until decompression would be required, rather than an indication of the nitrogen level. The amount of time is calculated from the projected rate of nitrogen increase at the current depth. The time information may be more easily understood by a diver, since the rate of nitrogen build up increases with time. At deep depths such as over 100 feet, the level in display 38 may be filled approximately half way immediately to further warn the diver of the limited time left.

Display 12 also includes a display 42 indicating the amount of time a diver has been down, a display 44 indicating the current depth, a display 46 indicating the maximum depth to which the diver has gone, a display 48 indicating the number of dives the diver has gone on, and a decompression status display 50. Decompression status display 50 activates when the no-decompression time shown on display 36 has been exceeded. This display will indicate ascents to 10, 20 or 30 feet decompression stops below the surface. The information is scrolled onto the display automatically, eliminating the need for the diver to manipulate a switch. After an appropriate time spent at the stop, the display will indicate the next decompression stop or clear, indicating it is safe to surface. The time at such stops is counted down in the no-decompression time display window 36.

A safe flight indicator 52 will display a pictograph of an aircraft when the calculated nitrogen levels in a person's tissues have returned to a level permitting safe high altitude flight. A display 54 provides an indication of low battery voltage. A surface interval display 56 activates when a person ascends to a shallow depth, such as four feet or less. Surface intervals are required according to the U.S. Navy dive tables for varying times depending upon the amount of nitrogen absorbed in the last dive. A group display 57 shows the group letter for the Navy dive tables. The group designation determines the depth and time a diver can spend on a next dive based on the maximum depth and time of the last dive and the surface interval.

Decompression computer display 12 provides an accurate no-decompression time indication on display 36 while also providing a quick reference in pictograph 38. Thus, the diver is given the benefit of both accuracy and a quick, easily readable display. The shape of the display (a person) indicates the nature of the information displayed (nitrogen absorbed (by person's tissues). Additionally, in air consumption computer display 14, pictographs 20, 26, 30 and 34 provide quick reference in addition to their corresponding accurate digital displays. The display values are preferably averaged when calculated to prevent flicker of the digital values displayed.

FIG. 2 is a schematic diagram of a prior art differential amplifier. A transducer 60 provides a differential signal with upper and lower levels $e_1$ and $e_2$ to a differential amplifier 62. The output of differential amplifier 62 is provided to an analog-to-digital (A/D) converter 64. Such an amplifier is difficult to build to give an accurate signal using CMOS technology and also consumes valuable die area. This is because the small differential signal from the transducer is significantly affected by offset voltage errors.

A schematic diagram of the preferred embodiment of the present invention is shown in FIG. 3. A pressure transducer 66 provides a differential signal $e_1$, $e_2$. A full scale pressure signal $e_{FS}$ is provided across a resister 68. Current is supplied to pressure transducer 66 from a current source 70. A separate temperature sensor 72 provides differential signals $e_1''$, $e_2''$ and a full scale reading $e_{FS}''$.

The differential and full scale signals are provided to a switch array 74. Signals from switch array 74 are then supplied through a buffer amplifier 76, an integrating amplifier 78 and a comparator 80 to a ten-stage counter 82. The output of counter 82 is provided to a latch 84 under the control of a controller 86 through decode logic 87. Decode logic 87 serves to decode control signals from controller 86 and provide control signals to the remaining circuitry including switch array 74 and a switch 88. Switch 88 couples the output of comparator 80 to an auto-zeroing capacitor 90. Decode logic 87 produces other control signals not shown to perform other functions such as turning off devices not being used to conserve power. The various control signals, such as R/W (read/write) and CS (chip select) are provided through latch 84 to control logic 87.

The differential signal from pressure transducer 66 is provided through switches 92, 94 to switch array 74. These signals can alternately be coupled through a differential amplifier 96 to provide an amplified differential signal when detecting a breath (where accuracy is not necessary). Potentiometer 98 serves to DC bias amplifier 96 in the proper operating range.

Controller 86 is put into an active state for operating decompression display 12 by a signal from a water sensor 98 to automatically activate the gauge. When controller 86 is used to operate air consumption display 14, it takes a reading every 5 seconds until it detects a minimum pressure (such as 50 psi) indicating that the gauge has been coupled to a SCUBA tank and the air valve has been turned on. A clock 100 provides a clocking signal to ten-stage counter 82.

The operation of the circuit of FIG. 3 is best understood by referring to FIGS. 3A–3C and FIG. 4. FIGS. 3A–3C show the different connections provided by switch array 74 and switch 88 during different cycles of operation. FIG. 4 shows a typical output signal of integrator 78 as applied to comparator 80. This signal is set to a level $e_2$ for an auto-zeroing cycle portion 102 by making the switch connections shown in FIG. 3A.

The lower voltage of a differential voltage across lines $e_1$, $e_2$ is coupled to an input of buffer 76. This is shown coming from a transducer 104 in FIG. 3A. Transducer 104 could be either temperature sensor transducer 72 or pressure transducer 66 of FIG. 3 depending upon the parameter being measured. During this auto-zeroing cycle 102, voltage level $e_2$ is stored on capacitor $C_Z$ along with the offset voltages of amplifiers 76, 78 and 80.

At a time 106 in FIG. 4, decode logic 87 causes switch array 74 and switch 88 to provide the connections shown in FIG. 3B. In FIG. 3B, signal $e_1$ is supplied to buffer 76 and signal $e_2$ is supplied to capacitor 90. The feedback from the output of comparator 80 to capacitor 90 is disconnected. During this cycle, the output of integrator 70 will be a ramping signal which is the integration of the difference between $e_1$ and $e_2$. This integrate cycle continues for a predetermined period of time until a time 108 as shown on FIG. 4.

At this point, the connections shown in FIG. 3C are established. The input to buffer 76 is grounded and the full scale transducer voltage, $e_{FS}$, is applied to capacitor 90. The output of integrator 78 will then jump to a level 110 which is equal to the integrated level and $e_2 - e_{FS}$. The output of integrator 78 will then ramp upwards in a de-integrate cycle until it reaches a level 112 which exceeds the level at input 114 of comparator 80. This will cause the output of comparator 80 to toggle at a time 116.

The ratio of the time between point 108 and point 116 to the fixed time between point 106 and point 108 gives a pressure reading as a proportion of a full scale pressure reading. The time is determined by having the output of comparator 80 stop the counting of ten-stage counter 82. The counting is initialized by a control signal from decode logic 87. The counter output is placed in latch 84 for examination by controller 86. By comparing this count to a full scale count, controller 86 can provide a pressure reading to the displays shown in FIG. 1. Similarly, a temperature reading can be provided by coupling temperature sensor 72 through switch array 74 in the same manner.

In order to determine the remaining air time, controller 86 takes several pressure readings and examines the pressure drop over time. The rate of pressure drop is averaged and is extrapolated from the then current pressure to produce a remaining air time.

The number of breaths per minute can be detected using differential amplifier 96. Differential amplifier 96 is AC coupled through a pair of capacitors 97, 99. Potentiometer 98 is adjusted so that the steady state output of amplifier 96 will produce a count near the midpoint of the range of counter 82. Variations from this steady state count in either the positive or negative direction can then be measured. A breath taken by a SCUBA diver will cause a momentary pressure disturbance when the air is withdrawn. This momentary pressure disturbance is amplified using differential amplifier 96. Since accuracy is not as important for detection of a breath, a differential amplifier can be used without worrying about offset voltages or other problems. Switches 92 and 94 are configured to couple differential signal $e_1$, $e_2$ to differential amplifier 96 and then back through switch array 74. Controller 86 again performs a series of readings, as set forth in FIGS. 3A–3C, and looks for a pressure disturbance above a certain magnitude and extending for a certain time corresponding to a waveform indicating a breath.

Once a breath is detected, controller 86 does not need to look again for a breath until a period of time corresponding to a maximum breathing rate. Thus, breaths only need to be looked for within a certain bandwidth window, allowing controller 86 to take other measurements and do other housekeeping functions in between. Amplifier 96 is needed to detect a breath because the absolute pressure drop from one breath would be less than the least significant bit of ten-stage 82.

Switches 92, 94 isolate amplifier 96 and capacitors 97, 99 so that they do not load down the auto-zeroing circuitry during a normal pressure reading. Control signals from controller 86 and current source 70 (indicating that the pressure transducer is operating) are processed through logic 93 to control switches 92, 94. Upon detection of a breath, controller 86 sends a signal to display 34 of FIG. 1 to fill up the lung pictograph. By determining the average time between breaths and dividing that number into 60, breaths per minute for display 32 are determined and displayed by signals from controller 86. The other displays of FIG. 1 are controlled similarly.

The circuitry implementing the device of FIG. 3 is preferably done in low power CMOS. This allows very little power to be used. When used for air consumption readings, controller 86 will do a pressure reading every five seconds and, if the pressure reading is less than some minimum pressure, such as 50 psi, the controller will go to sleep and not perform any calculations until five seconds later. Thus, the device is automatically activated by application of pressure exceeding 50 psi, eliminating the need for an on/off switch.

When used as a decompression computer, the circuit of FIG. 3 is activated by a water sensor 98. This water sensor detects the resistance of water across two leads which are external to the gauge body 10 of FIG. 1. The elimination of an on/off switch makes it much easier to waterproof the gauge. In addition, the danger of a diver accidentally hitting an on/off switch and losing the data is eliminated.

Two identical CMOS silicon chips can be used to implement the air consumption computer 14 and the decompression computer 12 of FIG. 1. The only differences are the types of transducers used and their interconnections. Alternately, a single CMOS chip could be used for both displays, with additional switches in switch array 74 being coupled to the additional transducers.

When used as a decompression computer, pressure transducer 66 measures the pressure of the water external to the gauge. Controller 86 regularly monitors this pressure and calculates the amount of time spent at each pressure. By using an algorithm or table such as the U.S. Navy tables, controller 86 can determine the amount of time the diver can remain at the then current depth (or pressure) without requiring decompression. In addition, when this time is exceeded, controller 86, using an algorithm or the U.S. Navy tables, can calculate the decompression stops required and display the depth of such stops and the time required at each stop on display 12.

The first water pressure reading received by controller 86 when activated by water sensor 98 is used as the sea level reading. This thus eliminates the need to adjust the algorithm in controller 86 for variations in the barometric air pressure reading due to changes in weather or elevation.

As will be understood by those familiar with the art, the present invention can be embodied in other forms without departing from the spirit or essential characteristics thereof. For example, the pictograph display 38 of a person in FIG. 1 could be in the form of a horizontal diver with fins. Alternately, this diver could have tank pictograph 22 attached to its back to provide a combined display. Accordingly, the foregoing embodiments are intended to be illustrative of, but not limiting of, the scope of the invention which is set forth in the following claims.

What is claimed is:

1. A method for displaying information to a diver comprising:
   producing an electrical signal proportional to a parameter to be measured;
   providing a pictograph display having a shape which conveys the type of information displayed; and
   producing a display indication on said pictograph display to a level related to the value of said electrical signal.

2. The method of claim 1 wherein said electrical signal is proportional to the air pressure in a SCUBA tank measured by a pressure transducer and said pictograph display is in a shape representing a SCUBA tank.

3. The method of claim 2 wherein said producing steps further comprise:
   producing a plurality of said electrical signals at different times;
   converting said electrical signals into digital values;
   storing a plurality of digital values corresponding to an air pressure in said tank at different times;
   determining a rate of use of air from said digital values and said times;
   determining an amount of remaining air time until said tank will be empty at said rate of use; and
   displaying said remaining air time.

4. The method of claim 1 wherein said signal is proportional to a water pressure measured by a pressure transducer and said pictograph display is in the shape of a person and further comprising:
   measuring an amount of time spent at each value of said water pressure;
   determining a nitrogen level from an algorithm or table for nitrogen absorbtion for each of said water pressure values and amounts of time; and
   filling said pictograph to a level proportional to said nitrogen level.

5. The method of claim 4 further comprising the steps of:
   determining a decompression time and a decompression stop depth according to a predetermined algorithm or table for a current value of said nitrogen level above a predetermined value;

displaying said decompression time and said decompression stop depth; and decrementing said decompression time when a pressure corresponding to said stop depth is detected.

6. The method of claim 1 wherein said electrical signal is proportional to the air pressure in a SCUBA tank measured by a pressure transducer and further comprising:

producing a second signal in response to each variation of a predetermined magnitude and predetermined time in said first mentioned signal;

measuring the time between successive occurrences of said second signal; and displaying a number corresponding to 60 seconds divided by said measured time.

7. The method of claim 6 further comprising:

providing a pictograph in the shape of a person's lungs; and filling said pictograph in response to each occurence of said first signal.

8. An apparatus for displaying information to a diver comprising:

a transducer adapted to produce an electrical signal proportional to a parameter to be measured;

a pictograph display having a shape which conveys the type of information displayed; and means, responsive to said electrical signal, for producing a fill level indication on said pictograph display.

9. The apparatus of claim 8 wherein said transducer is a pressure transducer adapted to couple to a SCUBA tank for measuring the pressure in said tank and said pictograph display is in the shape of a SCUBA tank.

10. The apparatus of claim 9 further comprising a microprocessor for determining a remaining air time from a current pressure and a rate of change of said pressure from a plurality of samples of said electrical signal at different times and display means for displaying said remaining air time.

11. The apparatus of claim 8 wherein said transducer is a pressure transducer adapted to measure an external water pressure and said pictograph display has a shape representing a person and further comprising:

means for converting said electrical signal into a digital pressure reading;

a microprocessor adapted to periodically sample said digital pressure reading and determine a nitrogen level according to a predetermined algorithm; and means, coupled to said microprocessor, for producing a fill level indication on said pictograph proportional to said nitrogen level.

12. The apparatus of claim 8 wherein said transducer is a pressure transducer adapted to measure a pressure in a SCUBA tank and further comprising:

means for producing a second signal when said first mentioned signal has a predetermined variation in magnitude for a predetermined time;

means for measuring the time between successive occurrences of said second signal; and means for displaying a number corresponding to 60 seconds divided by said time.

13. The apparatus of claim 8 further comprising at least one additonal display, said additional display having a border with a different color than a color of a border for said pictograph display.

* * * * *